United States Patent [19]

Stoy et al.

[11] 4,095,877

[45] Jun. 20, 1978

[54] SOFT CONTACT LENS FROM A MACROMOLECULAR BLOCK COPOLYMER

[75] Inventors: Vladimir Stoy; Otto Wichterle; Artur Stoy, all of Prague, Czechoslovakia

[73] Assignee: Ceskoslovenska akademie ved, Prague, Czechoslovakia

[21] Appl. No.: 605,510

[22] Filed: Aug. 18, 1975

[30] Foreign Application Priority Data

Sep. 26, 1974  Czechoslovakia ............... 8072-74

[51] Int. Cl.$^2$ ............... G02C 7/04; G08C 00/00; B29D 11/00
[52] U.S. Cl. ............... 351/160; 260/29.6 R; 264/1
[58] Field of Search ............... 351/160; 260/29.6 TA, 260/29.6 R; 264/1

[56] References Cited

U.S. PATENT DOCUMENTS

| 3,767,759 | 10/1973 | Wichterle et al. ............... 351/160 X |
| 3,812,071 | 5/1974 | Stoy ............... 351/160 X |
| 3,929,741 | 12/1975 | Laskey ............... 351/160 X |
| 3,931,123 | 1/1976 | Vacik et al. ............... 351/160 X |
| 3,948,870 | 4/1976 | Stoy et al. ............... 351/160 X |

FOREIGN PATENT DOCUMENTS 2,114,669  10/1971  Germany ............... 351/160

*Primary Examiner*—Conrad J. Clark

[57] ABSTRACT

The invention relates to a new type of soft contact lens from a hydrophilic, swelled copolymer, with high swelling capacity, high permeability for oxygen, comparatively high strength and low modulus of elasticity, said characteristics making the lens suitable for permanent wearing. The lens contains, at swelling equilibrium with water at 20° C, from about 50 to about 95% by weight of water, preferably from about 70 to about 90%, and consists of a multiblock copolymer of acrylonitrile with acrylamide, containing, if desired, a minor amount of other monomer units, not exceeding 20 molar percent. The swelled hydrogel contains two distinct but inseparable phases, one of them being polyacrylonitrile detectable by X-ray analysis, the other being amorphous highly solvated hydrophilic polymer containing predominantly acrylamide units.

5 Claims, No Drawings

SOFT CONTACT LENS FROM A MACROMOLECULAR BLOCK COPOLYMER

BACKGROUND OF THE INVENTION

Soft contact lenses from hydrogels were suggested by one of the inventors about twenty years ago. Best starting materials proved until now are sparingly crosslinked polymers of hydroxyethyl methacrylate, or random copolymers thereof with a minor amount of another more or less hydrophilic monomer. The main advantage of sparingly crosslinked hydroxyethyl methacrylate polymers is their high chemical and heat stability making possible repeated sterilization by boiling or by chemical bactericidal agents without deterioration. Said hydrogels are fully transparent and possess a sufficient tenacity and elasticity. Their characteristic property is a limited swelling capacity in water and in dilute aqueous solutions such as in physiologic saline, ranging from 38.6 to 40% of water in equilibrium state. The limited swelling capacity in water has, as a result, limited permeability for oxygen, insufficient for most wearers. Insufficient transport of oxygen to the cornea causes, after several hours of wearing, a haze or a halo around strong sources of light. After removing the lenses this trouble disappears usually during about half an hour, but the removal and the putting on of the lens are for many patients difficult, causing irritation and resulting sometimes in damaging, destroying or losing the lens. Moreover, a more frequent manipulation with the eye during a day increases the possibility of infection. Usually, it is necessary to remove the lens at least in the evening and to sterilize it the next day before putting it again on the eye. It would be therefore very desirable to improve soft contact lenses, regarding the permeability for oxygen and the comfort in wearing generally so that they could be worn permanently, day and night. Then also the repeated sterilization could be dispensed with because the eye is usually sterile as a result of the formation of lysozyme, destroying microbes and their spores.

The swelling capacity in water and thus also the permeability for oxygen can be increased in a well known manner, by copolymerizing hydroxyethyl methacrylate with a more hydrophilic monomer such as with diethyleneglycol monomethacrylate or vinyl pyrrolidone. Such copolymerization causes, however, a considerable loss of strength, particularly of structural strength so that the lens is easily torn if its edge is even slightly damaged. Moreover, the heat stability is also decreased by such copolymerization: Copolymers with vinyl pyrrolidone cannot be sterilized by boiling without permanent damage.

Said drawbacks seemed, until not, unavoidable, regarding the known characteristics of highly swollen polymer networks: they cannot be remedied e.g. by increasing the degree of crosslinking because the modulus of elasticity would be strongly increased and the structural strength further decreased so that the lenses would easily burst by swelling pressure.

The invention is based on the finding that covalent crosslinking used until now can be successfully replaced, either partially or fully, by non-covalent crosslinking in the form of small regions of crystalline or quasi-crystalline polyacrylonitrile, held together by strong dipoles between neighboring nitrile groups. The non-covalent network is sufficiently strong to ensure coherence of highly swelled hydrophilic segments of macromolecular chains even if the polyacrylonitrile regions or domains are so small that the hydrogel is fully transparent. As a result, the resulting two-phase multiblock acrylonitrile copolymers can be used at high swelling degrees, being still strong enough when other polymers with equally low content of dry substance would be more similar to viscous liquids than to shape-retaining hydrogels.

Multiblocks copolymers of acrylonitrile with acrylamide and a minor amount of acrylic acid can be prepared by controlled acid hydrolysis of polyacrylonitrile in a homogeneous medium. The control relates to providing first a restricted number of amido groups amidst the polyacrylonitrile chains and then in carrying out further hydrolysis at such decreased temperatures that only such nitrile groups are hydrolyzed that have an already formed amido group in their proximity. Then, the hydrolysis spreads along the polyacrylonitrile chain forming long sequences of polyacrylamide and leaving intact shorter or longer sequences of polyacrylonitrile. If the resulting multiblock copolymer is coagulated, e.g. from its solution in concentrated nitric acid, in water or in another coagulating liquid capable of solvating polyacrylamide but incapable of solvating — i.e., dissolving or swelling — polyacrylonitrile, the polyacrylonitrile segments, attracted by strong cohesion forces, agglomerate forming separate but inseparable polyacrylonitrile domains, enveloped by swelled polyacrylamide. As a result, the swelled hydrogel behaves as an elastomer, as a sort of rubber where covalent crosslinks of rubber are replaced by polyacrylonitrile domains, while the solvated hydrophilic segments, kinked, looped and bent in various conformations, can be elastically extended.

The elastic but strong network thus obtained can be molded at increased temperatures by pressure and shear deformation in swelled condition, in the range of about 70° to about 250° C, provided that the boiling of the swelling agent is avoided, i.e., either in closed molds or using a sufficiently high-boiling swelling agent. This thermoplastic molding is, however, possible even if the above described non-covalent crosslinking with polyacrylonitrile domains is combined with infrequent covalent binding, particularly if the crosslinks are long. Such hydrogels with double network are obtained, if acrylonitrile is polymerized in an acidic solvent which itself does not undergo chain transfer, the initial concentraton of acrylonitrile being sufficiently high, usually higher than about 15% by weight, to form, by chain transfer onto the monomer, trifunctional free radicals

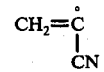

which are liable to cause rare crosslinks. The moldings of such sparingly crosslinked hydrogels with a strong non-covalent network display, at temperatures up to about 50° C, no "plastic memory" when worn permanently on the eyes. This kind of lenses cannot be, of course, sterilized by boiling, only chemical sterilization at temperatures lower than about 60° C being feasible.

If a high heat stability and possibility of repeated sterilization by boiling at atmospheric or increased pressure are required, the ready molded lens can be additionally crosslinked using suitable bifunctional or trifunctional compounds capable of reacting with amidic or nitrilic groups of the polymer. Suitable compounds are e.g. some aldehydes such as formaldehyde, isopropylaldehyde, butyraldehyde etc., polyisocyanantes such as hexamethylene diisocyanate or m-toluylene diisocyanate, diepoxides and similar. Crosslinking agents with a long chain are preferred. The conditions of reaction are to be chosen so that the degree of crosslinking remains low, in order to keep the elasticity appropriately high and the modulus of elasticity as low as possible. Such conditions can be easily determined by those skilled in the art, using lower concentrations of crosslinking agent, lower acidity and lower temperature than prescribed in the literature for analogous reactions involving the same reactive groups where a higher degree of crosslinking is desired.

Another way to obtain covalently crosslinked lenses from the hydrogels defined above consists in carrying out the polymerization of acrylonitrile in a solvent having but a negligible chain transfer constant, using either a sufficiently high initial monomer concentration as mentioned above, or adding a soluble crosslinking agent such as ethyleneglycol dimethacrylate. Dry or frozen blanks are then cut and polished to lenses in the way used in manufacturing hard contact lenses e.g. from poly/methyl methacrylate/. This method possesses, however, a drawback: The higher the swelling capacity of the hydrogel, the smaller are the blanks in dry condition. This makes the mechanical working of the blanks rather difficult, any even minute defect of the shape being enlarged by subsequent swelling.

The lens of the invention is characterized by its chemical composition, by its physical structure and by its unique wearing characteristics: From the chemical standpoint, it consists of multi-block copolymers of acrylonitrile with acrylamide and/or acrylic acid, usually with a small, unimportant amount of diacryl imide units, and, if desired, with a minor amount of other units incapable of destroying the multiblock structure of the copolymer. The lens is used in swelled condition, preferably in physiological saline or in another dilute aqueous solution isotonic with living tissue. Acrylamide units are usually prevailing.

From the physical or physico-chemical standpoint the lens consists of a two-phase hydrogel, one phase being polyacrylonitrile detectable by X-ray analysis, the other being amorphous and highly solvated with water, when in equilibrium therewith. "Detectable by X-ray analysis" means that macromolecules or their segments are arranged in a certain order so that regular reflexes appear on the X-ray photograph. The X-ray pattern of polyacrylonitrile is well known in the art and needs not to be described here in detail.

The two phases of the swelled copolymer are inseparable because each macromolecule passes, in average, through several domains of both of them. Another physical characteristic of the new contact lens is its swelling capacity: In equilibrium with water, it contains water in the range of 50 – 95% by weight, preferably 70 –90%.

The comfort at wearing is caused by a modulus of elasticity which is lower than that of the cornea, and by a sufficient transport of oxygen, making possible a practically permanent wearing.

All above mentioned characteristics of the new lens are causally connected: Wearing comfort is caused by physical structure which, in turn, is a result of the chemical composition and structure.

Multi-block copolymers of acrylonitrile can contain, besides the predominating acrylamide units, also a low amount of other units, either hydrophobic or hydrophilic, such as units of methacrylonitrile, methacrylic acid, methyl methacrylate, ethyl methacrylate, butyl methacrylate, maleic anhydride, vinyl carbazole, hydroxyethyl methacrylate, vinyl pyridine, sodium ethylene sulfonate, methacrylamide and other units of monomers copolymerizable with acrylonitrile. "A low amount" is such that cannot destroy the multiblock character of the copolymer when subjected to subsequent partial hydrolysis in an acid medium at temperatures ranging from $-20°$ to $+50°$ C, preferably from $0°$ to $20°$ C: As a rule, this amount should not exceed 20% /molar/.

Suitable chemical sterilization agents are e.g. hydrogen peroxide, peracetic acid, hypochlorites and chlorates of sodium, potassium or lithium and other strong oxidizing agents, the excess of which can be removed, after finished sterilization, by an innocuous reducing agent such as l-ascorbic acid, glucose and similar. Another suitable sterilizing agent is ethylene oxide.

The transport of oxygen through ahydrophilic polymer depends on its content of water, nearing, in case of highly swelled hydrogels, to the value of pure water. The permeability for oxygen does not increase, however, in linear dependence on the increasing content of water. If the content of water increases from 40 to 80% by weight, the diffusion rate of oxygen increases more than two times. High permeability for oxygen, as well as high softness of the lens makes possible permanent wearing. The elasticity and strength are at 80% of water content higher than those of glycol methacrylate lenses. At 90% of water content, the strength is still sufficient and approximately equal to the strength of best soft lenses used hitherto. Elastic elongation is also superior to that of other hydrogels, ranging from about 300 to about 1,000 of the rest length. Structural strength, i.e., the resistance against tearing from the edge, is also outstanding.

The lenses of the invention can be molded or shaped to various shapes, e.g. toric, astigmatic, corneal or scleral, symmetric or asymmetric.

On an eye with a large astigmatic defect a lens of suitable shape and correct curvature finds automatically its proper position, especially if the surface has been made slippery by introducing anionic neutralized groups. This can be made as usual by treating the lens for a predetermined time with an alkaline lye or with sulfuric or chlorosulfonic acid.

Several types of new soft contact lenses are described, together with various methods of manufacture, in the following non-limitative Examples wherein all parts and percentages are by weight, if not stated otherwise.

EXAMPLE 1

12 p. of anhydrous acrylonitrile were dissolved in 87.2 p. of a 65% colorless nitric acid. A solution of 0.12 p. of urea, dissolved in 0.28 p. of water, was added while stirring. When the colloidal dispersion of urea nitrate dissolved, the monomer solution was initiated by adding 0.2 p. of l-ascorbic acid and 0.2 p of a 10% aqueous solution of potassium persulfate. The homogenized solution was left standing under carbon dioxide 3 days at 20° C and 20 days at 8° C. The viscous solution thus obtained was extruded through a nozzle of 12 mm diameter, provided with an axial inlet for water. The extrusion was carried out using carbon dioxide at 4 atmospheres gauge, the drawing off velocity was 2 m/h and the introduction of water into the axial inlet was adjusted so that a hydrogel tube with 40 mm diameter and 0.15 mm wall thickness was obtained. The nozzle was immersed in 14° C tap water. The tube was washed in water to neutral reaction, then treated with a mixture of 70% of glycerol and 30% of water for 12 hours, and finally with pure glycerol for 6 hours. The elastic tube thus obtained was wiped from excessive glycerol on its surface and calendered at 150° C, whereby a 0.25 mm thick foil was obtained. 10mm discs were cut therefrom and molded at 150° C in a bipartite mold of phosphor bronze, provided with a tapered elastic edge. The molding pressure was kept during the whole cycle and subject to cooling to room temperature by means of a coiled pressure spring. The molding was washed free of glycerol and kept in physiologic saline at sterile condition. The lens swelled, in equilibrium with water at 20° C, to 65% of water, was transparent, very strong, rubber-like and shape retaining. Its permeability for oxygen was almost twice that of a lens from hydroxyethyl methacrylate, crosslinked with 0.3% of ethyleneglycol dimethacrylate, at 10 times higher tensile strength and 5 times higher elastic elongation.

Alternatively, the lens was made slippery on its surface by a 1 minute treatment with 25% sodium lye at 20° C and thorough washing.

EXAMPLE 2

The multiblock acrylonitrile/acrylamide copolymer according to Example 1 was prepared, extending the time of hydrolysis so that the swelling capacity in water attained 80% at 20° C. The treatment with glycerol was omitted and the water-swollen blanks were molded in the same mold at 100° C, the closed molds being immersed for two minutes into boiling water while steadily under pressure of the coiled spring. The lens, removed from the cooled mold, was slipped onto a 16 mm glass ball and immersed for 2 hours into a 0.5% formaldehyde solution, acidified with 0.5% of 36% hydrochloric acid, the temperature of the treatment being 65° C. The finished lens had 76% water content at swelling equilibrium and was shape retaining after a tenfold boiling in physiologic saline for 10 minutes. Its permeability for oxygen was more than 100% higher than that of a standard lens from hydroxyethyl methacrylate, crosslinked with 0.3% of ethyleneglycol dimethacrylate.

Alternatively, the lens was made slippery on its surface by a 20 seconds lasting treatment with a 100° C hot mixture of 4 p. of glycerol and 16 p. of sulfuric acid, followed by rinsing with water and neutralizing in a 1% sodium hydrocarbonate aqueous solution.

EXAMPLE 3

Polyacrylonitrile with an average molecular weight about 1,000,000 was prepared by usual precipitation polymerization in a 7.5% aqueous solution, washed, dried in a vacuum drier at 40° C and triturated to a fine powder which was dispersed with 1% of urea in 71% nitric acid cooled to −40° C. The dispersion containing 5% of polyacrylonitrile was stirred while the temperature slowly increased until a clear viscous solution was obtained. The solution was heated under stirring in a water-bath up to 40° C for a short time, and simultaneously degasified at decreased pressure. Then the solution was cooled and kept at +10° C for 21 days. Finally, the solution was kept for 5 days at 20° C, daylight being excluded. The solution was then worked to a foil according to Example 1, the treatment with glycerol being omitted. Instead, the washed tube was kept in a 5% aqueous solution of cyclic ethylene carbonate. The discs were molded in polypropylene molds 10 minutes at 90° C and cooled under pressure another 10 minutes to 20° C. The lenses displayed 91% water content at swelling equilibrium, the oxygen diffusion rate being about three times higher than that of standard hydroxyethyl methacrylate lenses.

EXAMPLE 4

30 p. of freshly distilled acrylonitrile was dissolved in 69 p. of a concentrated aqueous zinc chloride solution, density at 15° C 1.96. The solution was cooled down to −20° C and the polymerization started by adding 0.5 p of 10% aqueous potassium pyrosulfite and then 0.5 p of 10% aqueous ammonium persulfate solutions. The solution was stirred without cooling until the viscosity began to rise markedly. The solution, still liquid, was poured into a precooled flat pan kept in an exactly horizontal position in a cooling box. The 1 mm thick layer of the solution was covered with a 5 mm thick layer of white paraffin oil. The polymerization lasted 4 hours at −20° C and 4 hours at room temperature. The oil was poured out, the rest of it washed with hexane and the dry tough rubbery membrane removed from the pan and hung on the lid of a tightly closed 7 liters flask on the bottom of which 300 ml of 36% hydrochloric acid were poured. After 72 hours at 22° C the swelled foil was thoroughly washed in water, in a diluted solution of citric acid and in water again until no zinc ions could be established in the aqueous extract. Water was replaced by glycerol in the way described in Example 1 and blanks 13.5 mm diameter and 0.2 mm thickness were cut from the rubbery gel. The blanks were molded in a bipartite concave-convex mold made from phosphor bronze sheet, with tapered edge, at 160° C. The mold was held under pressure until cooled to room temperature. After removing overrun the lens was treated 15 minutes in concentrated sulfuric acid at room temperature, rinsed with water, neutralized with sodium hydrocarbonate solution, washed again and kept in physiologic saline. The lens was fully transparent, elastic, soft and strong, and contained, in equilibrium, 83% of water. It was very soft, smooth and slippery on the surface.

EXAMPLE 5

0.1 p. of N,N-methylene-bis-methacrylamide was added to the acrylonitrile — zinc chloride solution according to Example 4 prior to the initiation of polymerization. The solution, cooled to −14° C, was mixed with the redox initiator and metered into concave open rotary molds of a small experimental apparatus, placed on a pan and covered with a glass bell. About 5 ml of acrylonitrile were poured on the bottom of the pan and about 150 g of dry ice were added prior to putting the bell on. When the dry ice evaporated the rotation was discontinued and the molds left 64 hours in a space filled with hydrogen chloride containing gas mixture as described in Example 4. After a thorough washing in water the lens was sterilized by boiling and kept in sterile physiologic saline.

EXAMPLE 6

32 p. of anhydrous acrylonitrile, 1 p. of aluminum nitrate — nonahydrate, 0.1 p. of ammonium persulfate and 0.3 p. of acetylacetone were dissolved in 67.5 p. of colorless 65% nitric acid and cooled to 0° C. Then 0.2 g of ferric nitrate was admixed and the solution poured on a flat glass pan in a 5 mm thick layer, covered with a 5 mm thick layer of white paraffin oil and left to polymerize 24 hours at 0° C. The oil was poured out and washed with hexane, and the pan with clear polyacrylonitrile lyogel kept 2 days at 24° C and 14 days at 15° C. The rubbery gel was then thoroughly washed in water, in a diluted sodium hydrocarbonate solution and again in water to neutral reaction. Cylindrical blanks with 15 mm diameter and 6 mm height were cut from the hydrogel and boiled in a saturated solution of calcium chloride in anhydrous ethanol. Then the blanks were washed in anhydrous ethanol and dried at room temperature. Contact lenses were machined from the hard blanks, polished and swelled in physiologic solution. Their swelling capacity at equilibrium was 73% of water and the diffusion rate of oxygen approximately 200% of that of usual soft lenses from sparingly cross-linked hydroxyethyl methacrylate polymer.

EXAMPLE 7

Powdered multiblock copolymer of acrylonitrile with acrylamide was mixed with glycerol to a paste which was pressed into a mold preheated to 160° C through a heated passage, and kept at 170° C. The mold, having the shape of a scleral lens, was cooled while the pressure was still maintained. The die casting was cut clean on the edge, washed thoroughly in water and kept sterile in physiologic saline. The soft lens was transparent and homogeneous. It contained 83% of water at swelling equilibrium and had very good wearing characteristics.

We claim:

1. A soft contact lens suitable for substantially permanent wear and having a concavo-convex cross-sectional shape with its concave surface adapted to fit the human eye, which lens is formed from a water-swelled hydrogel (a) containing about 50 to about 90% by weight of water at swelling equilibrium with water at 20° C. and (b) consisting of a macromolecular block copolymer comprising (i) multiple segments of acrylonitrile units and (ii) multiple segments of acrylamide units and (iii) 0 to 20 molar % of other monomeric units, said macromolecular block copolymer being obtained from the partial acid hydrolysis of polyacrylonitrile and comprising in its water-swelled condition two distinct but inseparable phases, one of said phases being composed essentially of non-swelled crystalline or quasi-crystalline polyacrylonitrile segments non-covalently cross-linked by strong dipoles between nitrile groups and detectable by X-ray analysis showing the usual polyacrylonitrile pattern, the other of said phases being amorphous and being predominantly composed of highly swelled hydrophilic polyacrylamide segments.

2. A soft contact lens as set forth in claim 1, in which the water-swelled hydrogel contains about 70 to about 90% by weight of water at swelling equilibrium with water at 20° C.

3. A soft contact lens as set forth in claim 1, in which the surface has been made slippery by neutralizing anionic groups with alkali metal cations.

4. A soft contact lens as set forth in claim 1, in which the modulus of elasticity is lower than that of the cornea of the human eye.

5. The process of forming a soft contact lens suitable for substantially permanent wear and having a concavo-convex cross-sectional shape with its concave surface adapted to fit the human eye, which comprises molding a water-swelled hydrogel at 90° – 170° C into said lens shape and thereafter cooling in the mold under pressure, said hydrogel (a) containing about 50 to about 90% by weight of water at swelling equilibrium with water at 20° C. and (b) consisting of a macromolecular block copolymer comprising (i) multiple segments of acrylonitrile units and (ii) multiple segments of acrylamide units and (iii) 0 to 20 molar % of other monomeric units, said macromolecular block copolymer being obtained from the partial acid hydrolysis of polyacrylonitrile and comprising, in its water-swelled condition, two distinct but inseparable phases, one of said phases being composed essentially of non-swelled crystalline or quasi-crystalline polyacrylonitrile segments non-covalently crosslinked by strong dipoles between nitrile groups and detectable by X-ray analysis showing the usual polyacrylonitrile pattern, the other of said phases being amorphous and being predominantly composed of highly swelled hydrophilic polyacrylamid segments.

* * * * *